(12) United States Patent
Pathak et al.

(10) Patent No.: US 11,974,141 B2
(45) Date of Patent: *Apr. 30, 2024

(54) ALLOCATING RESOURCES TO INTERNET OF THINGS EQUIPMENT IN A FIFTH GENERATION (5G) NETWORK OR OTHER NEXT GENERATION NETWORKS

(71) Applicant: AT&T Mobility II LLC, Atlanta, GA (US)

(72) Inventors: Shomik Pathak, Richardson, TX (US); James P. Daves, Acworth, GA (US); Iftekhar Alam, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,238

(22) Filed: Feb. 17, 2023

(65) Prior Publication Data
US 2023/0209364 A1 Jun. 29, 2023

Related U.S. Application Data

(63) Continuation of application No. 17/186,291, filed on Feb. 26, 2021, now Pat. No. 11,595,825.

(51) Int. Cl.
*H04W 16/22* (2009.01)
*H01Q 1/24* (2006.01)
(Continued)

(52) U.S. Cl.
CPC ............ *H04W 16/22* (2013.01); *H01Q 1/246* (2013.01); *H01Q 3/34* (2013.01); *H01Q 21/28* (2013.01);
(Continued)

(58) Field of Classification Search
CPC .......... H01Q 1/246; H01Q 3/34; H01Q 21/28; H04B 7/043; H04B 17/309; H04L 5/001; H04W 72/04; H04W 72/048; H04W 72/12
(Continued)

(56) References Cited

U.S. PATENT DOCUMENTS 11,595,825 B2 * 2/2023 Pathak ............... H04L 5/001
2014/0080509 A1 * 3/2014 Siomina ............. G01S 5/10
455/456.1

(Continued)

*Primary Examiner* — Don N Vo
(74) *Attorney, Agent, or Firm* — Guntin & Gust, PLC; Dana B. LeMoine

(57) ABSTRACT

The technologies described herein are generally directed to facilitate allocating resources to zones for IOT equipment in a fifth generation (5G) network or other next generation networks. An example method discussed herein includes identifying, by carrier allocation equipment, carrier transmission information corresponding to transmission of a first carrier signal configured to support Internet of things equipment. The method can further comprise analyzing, by the carrier allocation equipment, the carrier transmission information to determine coverage information corresponding to a potential for coverage, by the first carrier signal, of an Internet of things equipment support zone corresponding to a geographic area. The method can further include, based on the coverage information, facilitating configuring transmission parameter information, representative of a transmission parameter applicable to the coverage of the Internet of things equipment support zone by the first carrier signal.

20 Claims, 10 Drawing Sheets

Related U.S. Application Data

(60) Provisional application No. 63/150,181, filed on Feb. 17, 2021, provisional application No. 63/150,178, filed on Feb. 17, 2021, provisional application No. 63/150,175, filed on Feb. 17, 2021.

(51) Int. Cl.
| | |
|---|---|
| *H01Q 3/34* | (2006.01) |
| *H01Q 21/28* | (2006.01) |
| *H04B 7/0426* | (2017.01) |
| *H04B 17/00* | (2015.01) |
| *H04B 17/309* | (2015.01) |
| *H04B 17/391* | (2015.01) |
| *H04L 5/00* | (2006.01) |
| *H04W 16/02* | (2009.01) |
| *H04W 16/28* | (2009.01) |
| *H04W 72/04* | (2023.01) |
| *H04W 72/0453* | (2023.01) |
| *H04W 72/12* | (2023.01) |
| *H04W 72/51* | (2023.01) |

(52) U.S. Cl.
CPC ......... *H04B 7/043* (2013.01); *H04B 17/0087* (2013.01); *H04B 17/309* (2015.01); *H04B 17/3912* (2015.01); *H04L 5/001* (2013.01); *H04W 16/02* (2013.01); *H04W 16/28* (2013.01); *H04W 72/04* (2013.01); *H04W 72/0453* (2013.01); *H04W 72/12* (2013.01); *H04W 72/51* (2023.01)

(58) Field of Classification Search
USPC .......................................................... 455/437
See application file for complete search history.

(56) References Cited

U.S. PATENT DOCUMENTS

| | | | |
|---|---|---|---|
| 2018/0077696 A1* | 3/2018 | Lee | H04W 72/02 |
| 2018/0242179 A1* | 8/2018 | Rathonyi | H04W 24/08 |
| 2019/0191466 A1* | 6/2019 | Xu | H04W 74/0883 |
| 2019/0254013 A1* | 8/2019 | Chang | H04L 5/00 |

* cited by examiner

ALLOCATING RESOURCES TO INTERNET OF THINGS EQUIPMENT IN A FIFTH GENERATION (5G) NETWORK OR OTHER NEXT GENERATION NETWORKS

RELATED APPLICATIONS

The subject patent application is a continuation of, and claims priority to, U.S. patent application Ser. No. 17/186,291, filed Feb. 26, 2021, and entitled "ALLOCATING RESOURCES TO INTERNET OF THINGS EQUIPMENT IN A FIFTH GENERATION (5G) NETWORK OR OTHER NEXT GENERATION NETWORKS," each of which applications claim priority to each of U.S. Provisional Patent Application No. 63/150,175, filed on Feb. 17, 2021, and entitled "LAUNCHING RADIO SPECTRUM RESOURCES INTO A FIFTH GENERATION (5G) NETWORK OR OTHER NEXT GENERATION NETWORKS," U.S. Provisional Patent Application No. 63/150,178, filed on Feb. 17, 2021, and entitled "CARRIER AGGREGATION CONFIGURATION IN FIFTH GENERATION (5G) NETWORKS OR OTHER NEXT GENERATION NETWORKS," and U.S. Provisional Patent Application No. 63/150,181, filed on Feb. 17, 2021, and entitled "ALLOCATING RESOURCES TO INTERNET OF THINGS EQUIPMENT IN A FIFTH GENERATION (5G) NETWORK OR OTHER NEXT GENERATION NETWORKS." The respective entireties of the aforementioned priority applications are hereby incorporated by reference herein.

TECHNICAL FIELD

The subject application is related to implementation of fifth generation (5G) wireless communication systems or other next generation wireless communication systems, and, for example, different approaches to allocating resources to Internet of things equipment.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
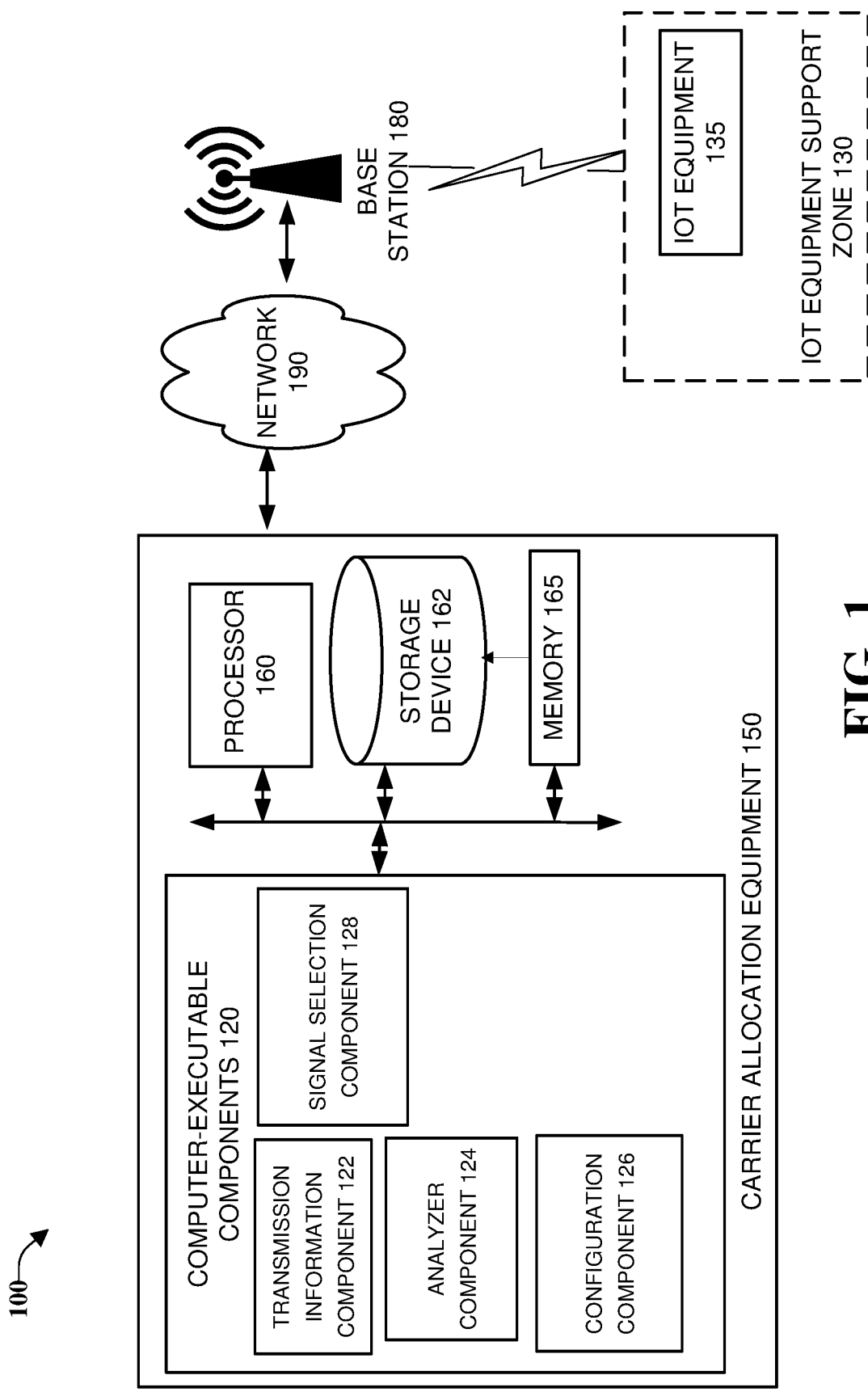
FIG. 1 is an architecture diagram of an example system that can facilitate allocating resources to zones for Internet of things (IOT) equipment, in accordance with one or more embodiments.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate allocating resources to zones for IOT equipment. Different examples that describe these aspects are included with the description of FIGS. 1-10 below. It should be noted that the subject disclosure may be embodied in many different forms and should not be construed as limited to any combinations of examples set forth herein.

Generally speaking, one or more embodiments can facilitate allocating wireless resources to zones for IOT equipment. In addition, one or more embodiments described herein can be directed towards a multi-connectivity framework that supports the operation of new radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

Networks that can be facilitated by one or more implementations described herein can include a wireless communication system, and thus can include one or more communication service provider networks that facilitate providing wireless communication services to various user equipments included in the one or more communication service provider networks. The one or more communication service provider networks can include various types of disparate networks, including but not limited to: cellular networks, femto networks, picocell networks, microcell networks, internet protocol (IP) networks, Wi-Fi service networks, broadband service networks, enterprise networks, cloud-based networks, and the like.

For example, in at least one implementation, system 100 can be used to facilitate the implementation of parts of a large-scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.). One or more embodiments can facilitate the placement of multiple antennas in a geographic area enabling coverage by networks that include, but are not limited to, communication service provider networks. In exemplary, non-limiting embodiments described herein, simulated groups of antennas can include millimeter wave (mmWave) antennas of a base station of a cellular network, e.g., a fifth generation or other next generation RAN. In certain implementations of types of mmWave antennas, large numbers of antennas are deployed in comparison with the number of other types of antennas that can be employed, e.g., up to and exceeding in some circumstances, one hundred antennas per square mile.

In some embodiments the non-limiting terms "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., allocating complex and potentially rapidly changing resources to zones for Internet of things equipment), that are not abstract and cannot be performed as a set of mental acts by a human. For example, a human, or even a plurality of humans, cannot efficiently configure and maintain the configurations required to allocate resources to zones for Internet of things equipment at the same level of optimization, accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate allocating resources to zones for Internet of things equipment. It should be noted that the subject disclosure may be embodied in many different forms and should not be construed as limited to this example or other examples set forth herein.

The above-described background relating to network hardware is merely intended to provide a contextual overview of some current issues, and is not intended to be exhaustive. Other contextual information may become further apparent upon review of the following detailed description.

FIG. 1 is an architecture diagram of an example system 100 that can facilitate allocating resources to zones for Internet of things equipment, in accordance with one or more embodiments. For purposes of brevity, description of like elements and/or processes employed in other embodiments is omitted.

As depicted, system 100 can include carrier allocation equipment 150 communicatively coupled to base station equipment 180 via network 190. In one or more embodiments, carrier allocation equipment 150 can include computer executable components 120, processor 160, storage device 162, and memory 165. System 100 further includes IOT equipment support zone 130. It should be noted that, although many examples herein discuss directing particular wireless resources to zones for IOT devices, one having skill in the relevant art(s), given the description herein would appreciate that the approaches can also apply to any network device that can benefit from dedication of wireless resources.

Computer executable components 120 can include transmission information component 122, analyzer component 124, configuration component 126, and other components described or suggested by different embodiments described herein that can facilitate or improve the operation of system 100. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, carrier allocation equipment 150 can further comprise various computer and/or computing-based elements described herein with reference to operating environment 1000 and FIG. 10.

According to multiple embodiments, network 190 can comprise, but are not limited to, wired (including optical) and wireless networks, including, but not limited to, a cellular network, a wide area network (WAN) (e.g., the Internet) or a local area network (LAN). For example, system 100 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), 5G and other next generation network technologies, third generation partnership project 2 (3GPP2) ultra-mobile broadband (UMB), high speed packet access (HSPA), Zigbee and other 802.XX wireless technologies and/or legacy telecommunication technologies, BLU-ETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1406 and FIG. 14. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

According to multiple embodiments, carrier allocation equipment 150 can include memory 165 that can store one or more computer and/or machine readable, writable, and/or executable components and/or instructions 120 that, when respectively executed by processor 160, can facilitate performance of operations defined by the executable component(s) and/or instruction(s).

Generally, applications (e.g., computer-executable components 120) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, handheld computing devices, microprocessor-based or programmable consumer electronics, and the like, each of which can be operatively coupled to one or more associated devices.

It should be appreciated that the embodiments of the subject disclosure depicted in various figures disclosed herein are for illustration only, and as such, the architecture of such embodiments are not limited to the systems, devices, and/or components depicted therein. For example, in some embodiments, carrier allocation equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

For example, in one or more embodiments, computer executable components 120 can be used in connection with implementing one or more of the systems, devices, components, and/or computer-implemented operations shown and described in connection with carrier allocation equipment 150 of FIG. 1 or other figures disclosed herein. For example, in one or more embodiments, computer executable components 120 can include instructions that, when executed by processor 160, can facilitate performance of operations defining transmission information component 122. As discussed below, transmission information component 122 can, in accordance with one or more embodiments, identify carrier transmission information corresponding to transmission of a first carrier signal configured to support Internet of things equipment, e.g., illustrated with FIGS. 4-5 below.

In another example, in one or more embodiments, computer executable components 120 can further include instructions that, when executed by processor 160, can facilitate performance of operations defining analyzer component 124. As discussed with below, analyzer component 124 can, in accordance with one or more embodiments, analyze the carrier transmission information to determine coverage information corresponding to a potential for coverage, by the first carrier signal, of an Internet of things equipment support zone 130 corresponding to a geographic area.

In another example, in one or more embodiments, computer executable components 120 can additionally include instructions that, when executed by processor 160, can facilitate performance of operations defining configuration component 126. As discussed with FIGS. 3, 5, and 6 below, configuration component 126 can, in accordance with one or more embodiments, based on the coverage information, facilitating, by the carrier allocation equipment, configuring transmission parameter information, representative of a transmission parameter applicable to the coverage of the Internet of things equipment support zone by the first carrier signal.

It should be noted that, in one or more embodiments, system 100 and other embodiments described herein can employ hardware and/or software to solve problems that are highly technical in nature, including improving the operation of base station equipment and user equipment. One having skill in the relevant art(s), given the disclosure herein, would appreciate that the technical problems that can be solved by one or more embodiments described herein are not abstract and cannot be performed as a set of mental acts by a human.

Further, in certain embodiments, some of the processes performed can be performed by one or more specialized computers (e.g., one or more specialized processing units, a specialized computer such as tomography and reconstruction, statistical estimation, specialized routing analysis, and so on) for carrying out defined tasks related to selecting from multiple available carrier signals, identifying carrier signals that can satisfy requirements for supporting IOT devices, and based on the coverage information, facilitating the configuring transmission parameter information, representative of a transmission parameter applicable to the coverage of the Internet of things equipment support zone by the first carrier signal.

System 100 and/or components of the system can be employed to solve new problems that arise through advancements in technologies mentioned above, computer architecture, and/or the like. The above-described background relating to network hardware is merely intended to provide a contextual overview of some current issues, and is not intended to be exhaustive. Other contextual information may become further apparent upon review of the following detailed description.

Figure 2:
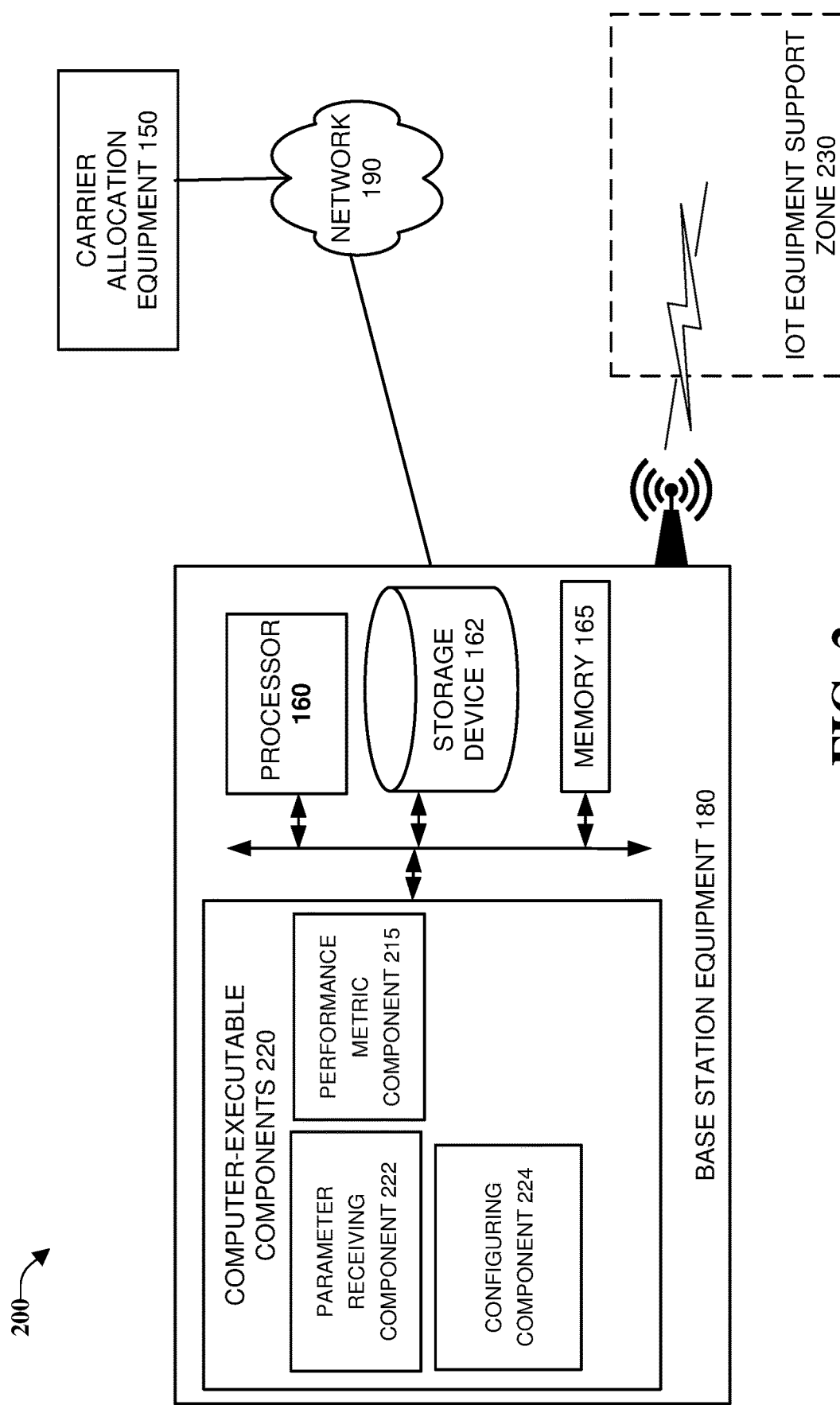
FIG. 2 is a diagram of a non-limiting example system that can facilitate allocating resources to zones for IOT equipment based on transmission information provided on an ongoing basis by base station equipment, in accordance with one or more embodiments.

FIG. 2 is a diagram of a non-limiting example system 200 that can facilitate allocating resources to zones for Internet of things equipment based on transmission information provided on an ongoing basis by base station equipment, in accordance with one or more embodiments. For purposes of brevity, description of like elements and/or processes employed in other embodiments is omitted.

As depicted, system 200 can include base station equipment 180 connected to carrier allocation equipment 150 via network 190. Base station equipment 180 can include memory 165 that can store one or more computer and/or machine readable, writable, and/or executable components and/or instructions 220 that, when respectively executed by processor 160, can facilitate performance of operations defined by the executable component(s) and/or instruction(s).

Generally, applications (e.g., computer-executable components 120) can include routines, programs, components, data structures, etc., that perform particular tasks or implement particular abstract data types. In system 200, computer executable components 220 can include parameter receiving component 222, configuring component 224, performance metric component 215, and other components described or suggested by different embodiments described herein that can improve the operation of system 100. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, base station equipment 180 can further comprise various computer and/or computing-based elements described herein with reference to operating environment 1000 described with FIG. 10.

In one or more embodiments, computer executable components 220 can be used in connection with implementing one or more of the systems, devices, components, and/or computer-implemented operations shown and described in connection with FIG. 2 or other figures disclosed herein. In one or more embodiments, computer executable components 220 can include instructions that, when executed by processor 160, can facilitate performance of operations defining parameter receiving component 222. As discussed below, parameter receiving component 222 can, in accordance with one or more embodiments, identify carrier transmission information corresponding to a first carrier and a second carrier, originating from an antenna face.

Processor 160 can further facilitate performance of operations defining parameter configuring component 224. As discussed below, parameter receiving component 222 can, in accordance with one or more embodiments, based on the transmission parameter data, configuring the carrier signal to provide the Internet of things equipment support with respect to the Internet of things equipment support zone.

Figure 3:
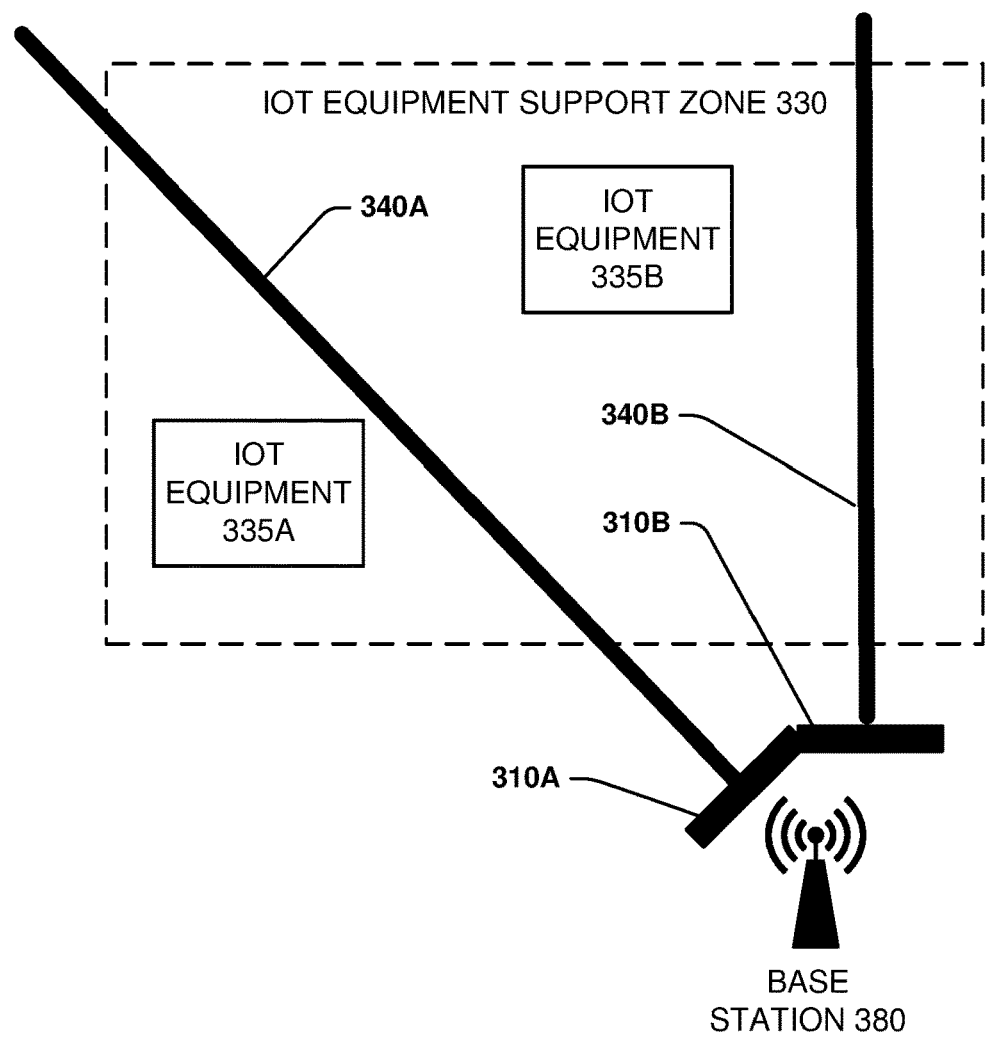
FIG. 3 depicts a non-limiting example system that can facilitate allocating resources to zones for IOT equipment based on transmission information, in accordance with one or more embodiments.

FIG. 3 depicts a non-limiting example system 300 that can facilitate allocating resources to zones for Internet of things equipment based on transmission information, in accordance with one or more embodiments. For purposes of brevity, description of like elements and/or processes employed in other embodiments is omitted.

As depicted, system 300 includes base station equipment 180 proximate to IOT equipment support zone 330. Base station equipment 380 has antenna array faces 310A-B, with respective carrier signal beams 340A-B directed into IOT equipment support zone 330, which includes IOT equipment 335A-B.

It should be noted that, as used herein, antenna array faces (also termed faces, array faces) can refer to a surface of an antenna from which a signal beam (e.g., carrier signal beams 340A-B) can emit in a direction that is aimed by the antenna face. While this term can be associated with beams from any type of antenna, e.g., from narrow beam picocell antennas to macrocell wider beam antennas, the older, wider beam antennas were less susceptible to the precise aiming used to direct pencil-beam antennas used extensively in 5G network implementations. One or more embodiments can utilize analysis of the newly installed antenna arrays, with precisely directed beam coverage to more efficiently allocate wireless resources from the broad variety of installed equipment.

For example, as depicted in FIG. 3, carrier signal beams 340A-B can be mmWave, pencil-beams directed by faces 310A-B. To map the coverage of carrier signal beams 340A-B, one or more embodiments can utilize transmission information about the beams, including the geographic location and angle of antenna array faces 310A-B, combined with other transmission information relevant to propagation, such as signal strength, beam-width, and frequency. It should be noted that, one or more embodiments can provide improvements in wireless resource allocation not only by mapping single beams, but also by analyzing the collective mapping of the characteristics, capabilities, and coverage of many types of beams in a particular area.

Considering the wireless resource allocation depicted in FIG. 3, as a part of customer services provided, IOT equipment support zone 330 is to be provided with a minimum level of wireless coverage that includes certain IOT services, available for these types of potentially constantly active, relatively low-bandwidth devices. In some implementations, because of the specifics of certain IOT protocols, coverage for IOT equipment support zone 330 can only be provided from certain frequency bands, e.g., channels of the 700 MHz B12 band and the 1900 MHz B2 band can be used.

One or more embodiments can provide assistance in handling particular characteristics of IOT service coverage. For example, in some implementations, when these bands are allocated for IOT services use however, they are not available for other commercial uses (e.g., mobile device communication) even when no IOT devices are present in IOT equipment support zone 330. Thus, it can often improve efficiency to cover the territory required by the services with minimum levels of coverage, from bands that are less impacted by the overhead of these services. Because of this however, in some implementations, coverage for certain areas is provided by a single beam from a single tower and when this beam is interrupted, backup beams must be prepared or IOT device services could be completely interrupted for a relatively long amount of time. In some circumstances, the precision with which primary and backup IOT services must be planned is only augmented by the limited beam coverage of many types of 5G implemented narrowband antennas.

Figure 4:
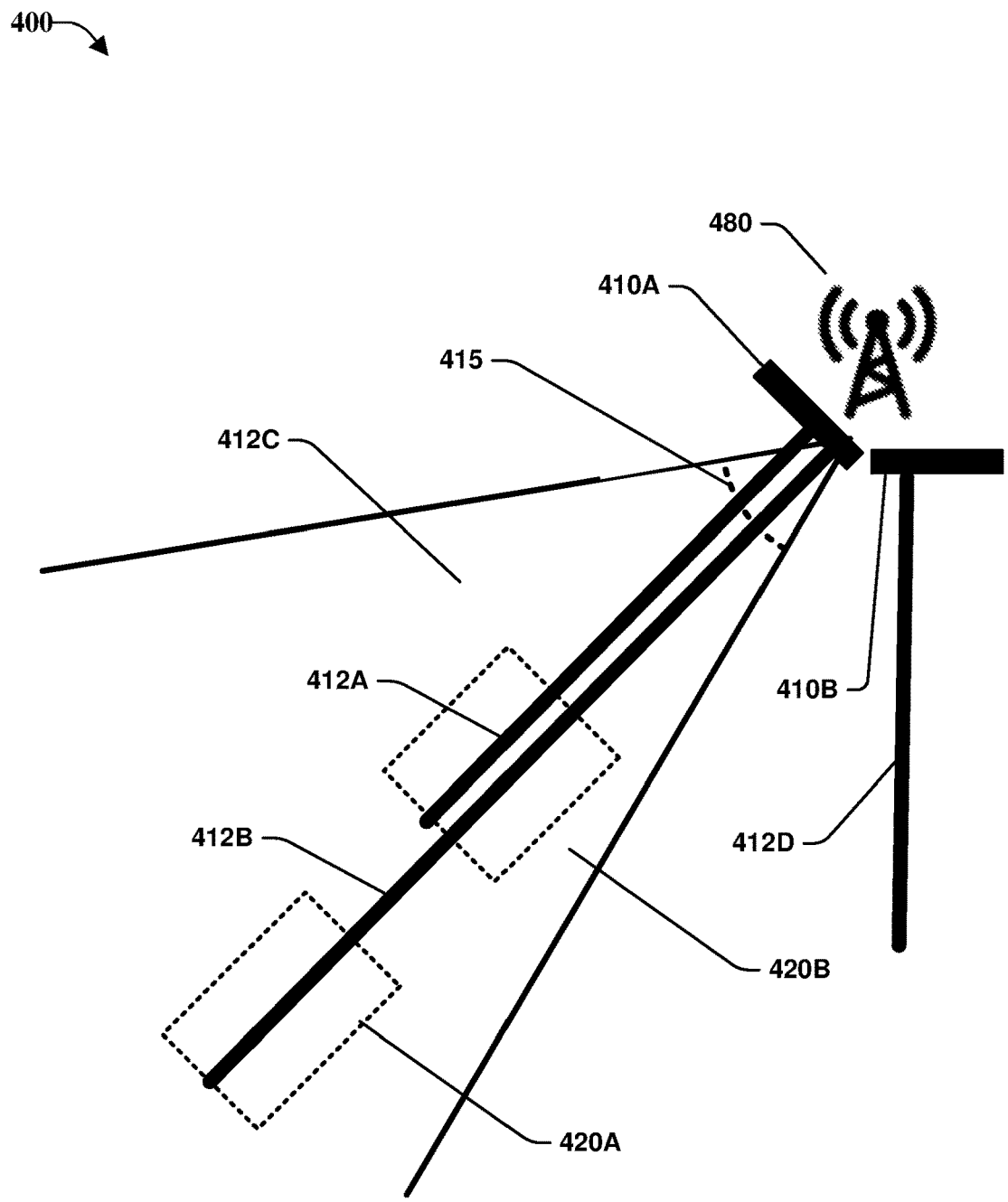
FIG. 4 is a diagram of a non-limiting example system that can facilitate allocating resources to zones for IOT equipment based on transmission information, in accordance with one or more embodiments.
Figure 5:
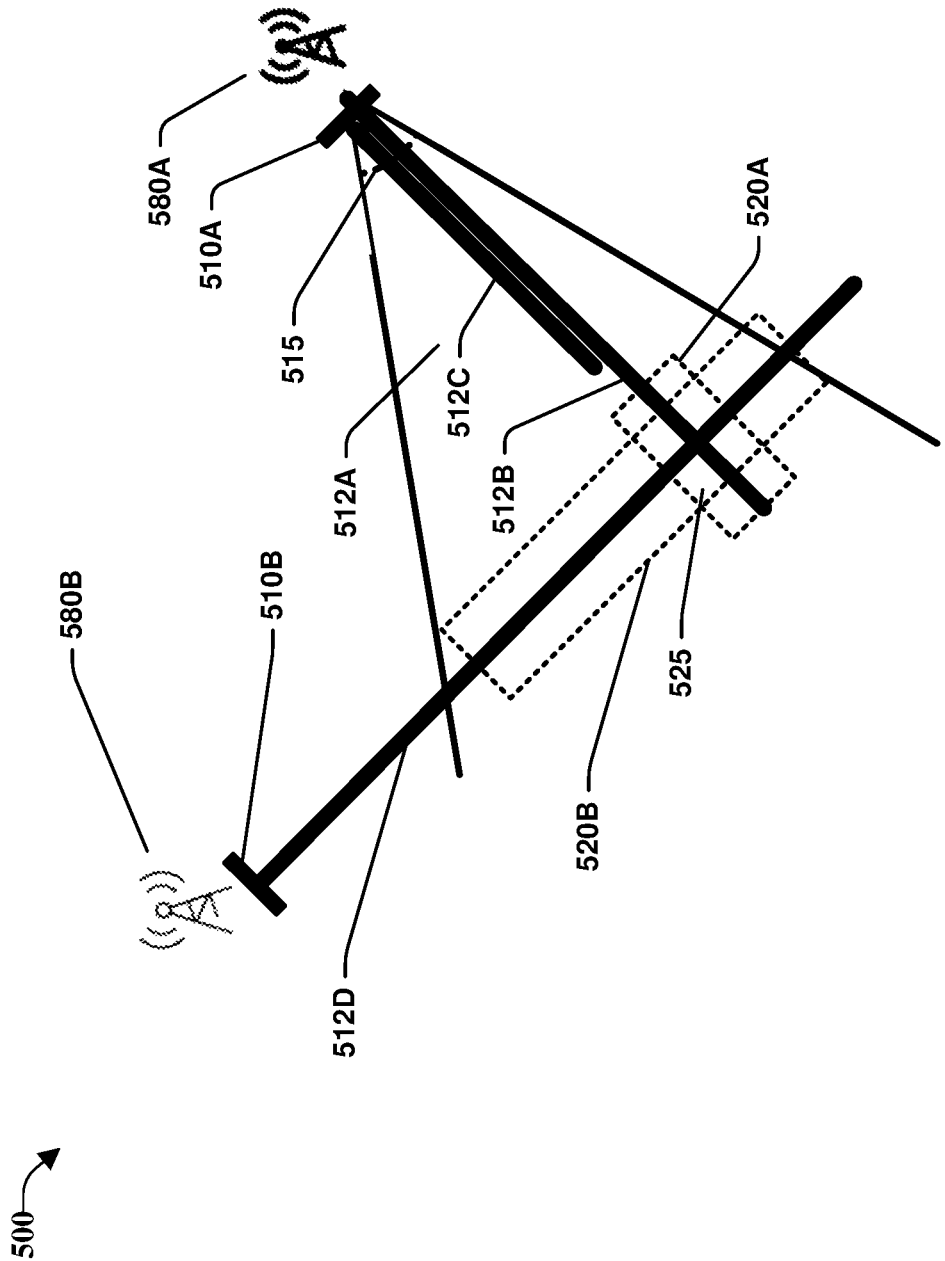
FIG. 5 is a diagram of a non-limiting example system that can facilitate allocating resources to zones for Internet of things equipment, in accordance with one or more embodiments.
Figure 6:
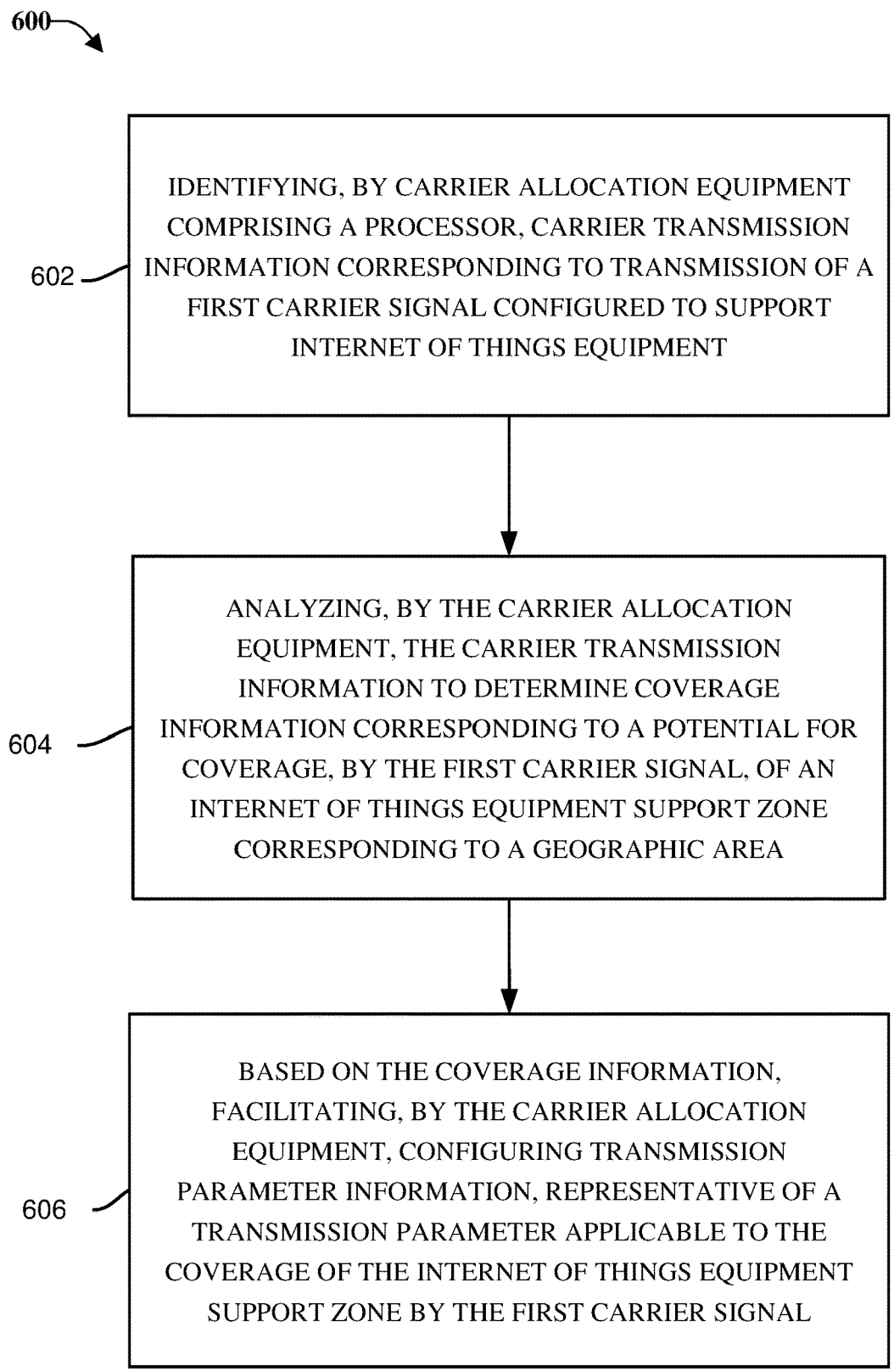
FIG. 6 illustrates an example method that can facilitate allocating resources to zones for IOT equipment, in accordance with one or more embodiments.
Figure 7:
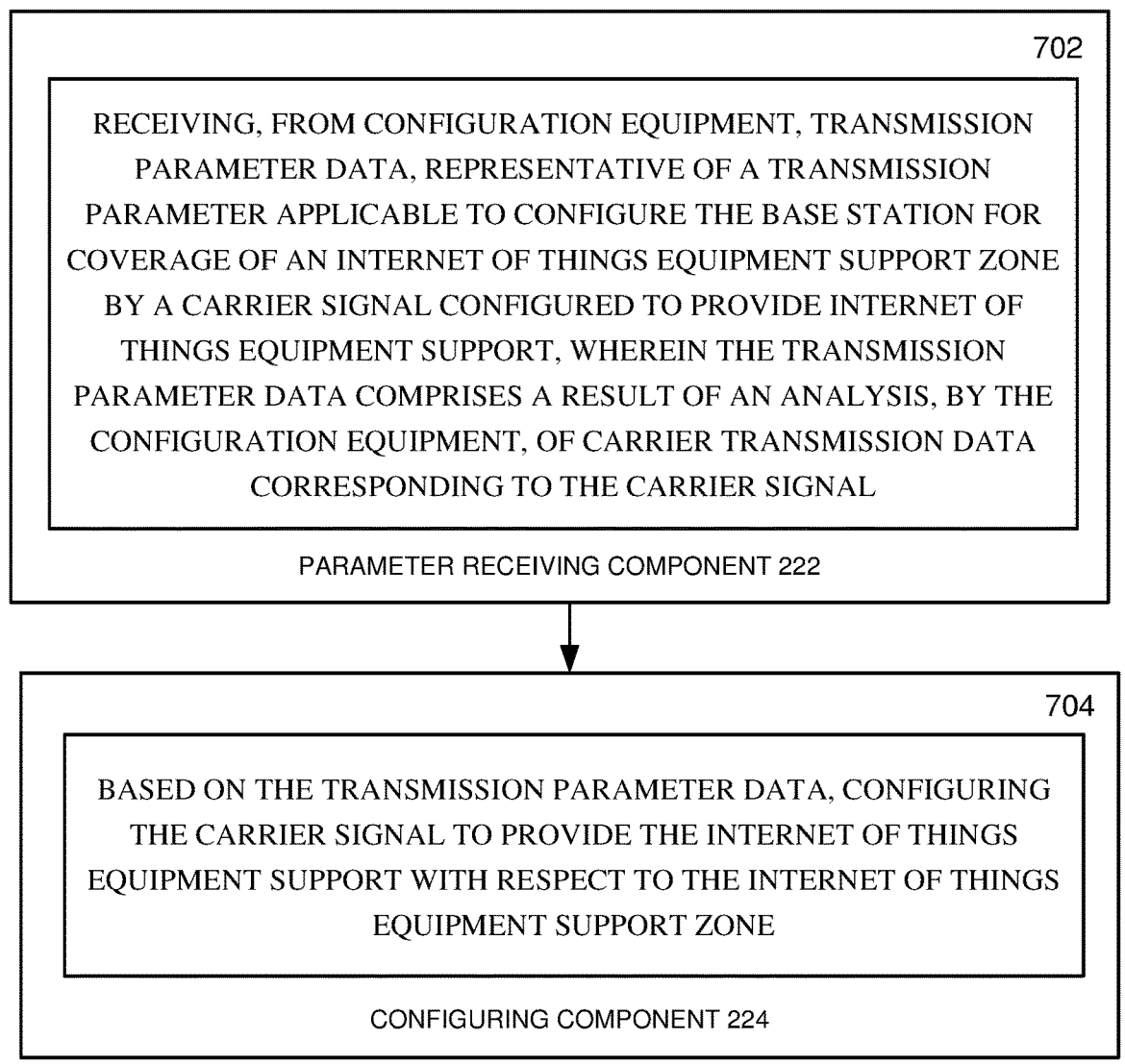
FIG. 7 is a diagram of a non-limiting example flowchart of a system that can facilitate configuring a carrier signal of base station equipment to provide IOT equipment support, in accordance with one or more embodiments.
Figure 8:
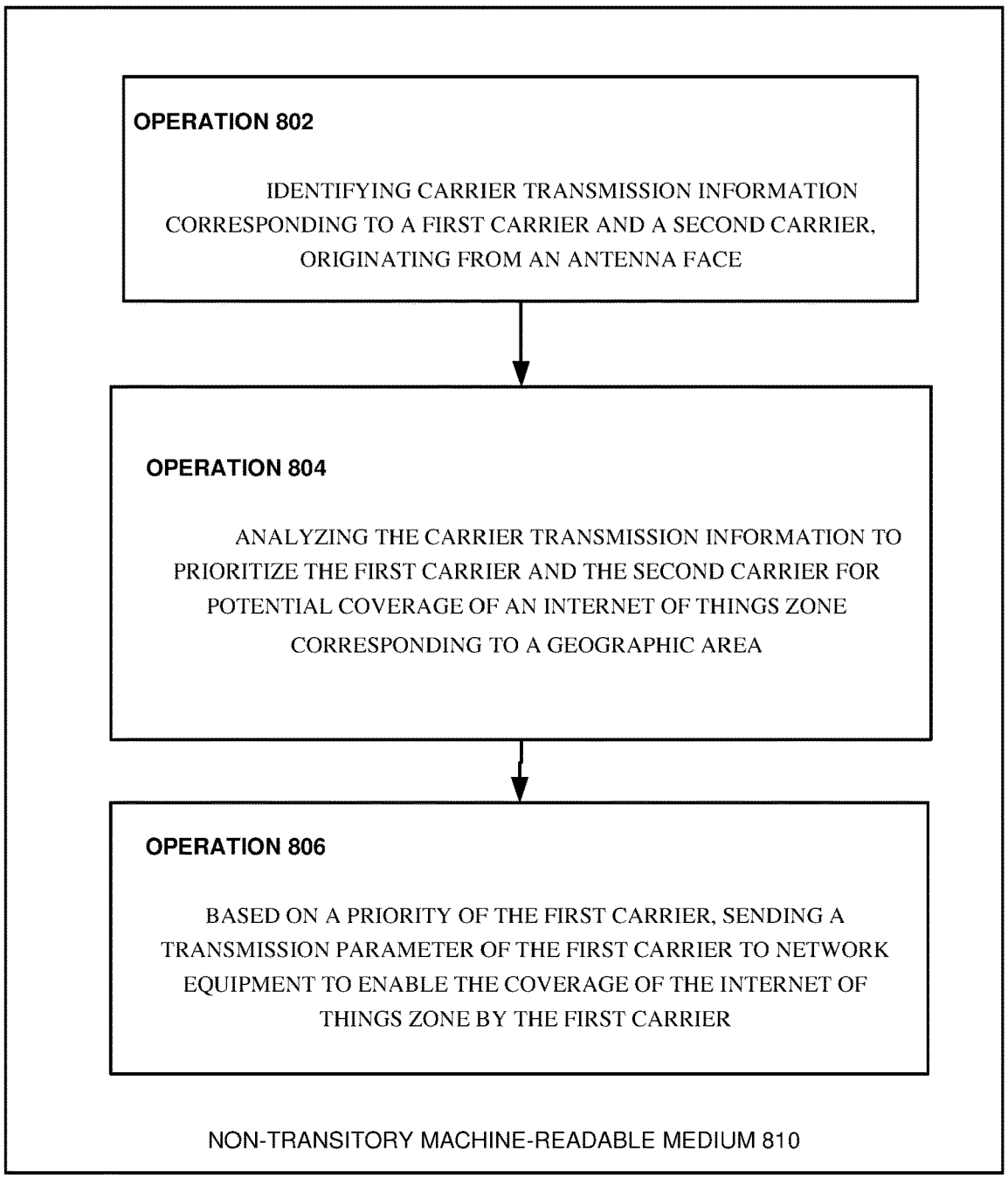
FIG. 8 depicts an example non-transitory machine-readable medium that can include executable instructions that, when executed by a processor of a system, can facilitate allocating resources to zones for IOT equipment, in accordance with one or more embodiments described above.

As described further herein, approaches used by one or more embodiments can address many of the issues specific to current and potentially future types of wireless resource allocations. FIG. 4 provides more detailed examples of the transmission information that can be used by some embodiments to design coverage of a base station for particular geographic areas, and FIG. 5 depicts how some implementations of embodiments can be applied to beams from multiple base stations, e.g., to improve opportunities for broader, redundant coverage. FIGS. 6-8 respectively provide an example method, system, and non-transitory machine-readable medium that can be used to implement one or more of the embodiments described and suggested by the present disclosure.

FIG. 4 is a diagram of a non-limiting example system 400 that can facilitate allocating resources to zones for Internet of things equipment based on transmission information, in accordance with one or more embodiments. For purposes of brevity, description of like elements and/or processes employed in other embodiments is omitted.

As depicted, system 400 includes base station equipment 480 with faces 410A-B. Faces 410A-B are depicted as sources of carrier signals 412A-C and 412D respectively. Carrier signal 412C is depicted as originating from face 410A with beam width 415. Based on the carrier signals 412A-C, carrier overlap zones 420A-B are identified.

Generally speaking, one or more embodiments can analyze carrier transmission data to determine the predicted coverage of carrier signals 412A-D This information can be measured based on the operation of base station equipment 480, but can also be predicted based on applying rules of physics and wireless signal propagation to the configuration of the transmission resources of base station equipment 480, e.g., transmission information described below, used potentially as initial configuration information for setting up or maintaining the transmission resources of base station equipment 480.

As discussed with FIG. 3 above, the present description of base station faces 410A-B can describe the direction of propagation of generated signals, e.g., face 410A depicted as originating carrier signals 412A-C, and face 410B depicted as originating carrier signal 412D in a different direction. Of note is that, by evaluating the coverage all the carrier signals 412A-C that originate from face 410A (e.g., macrocell carrier signal 412C and picocell carrier signals 412A-B), one or more embodiments can identify and evaluate potentially useful opportunities for allocating available, efficient bands of signals to improve the efficiency of coverage as well as facilitate the design, by one or more embodiments, of carrier signals allocated to provide backup in cases of signal interruption or surges in demand.

This phase, which can identify different candidate signals for providing IOT services coverage (e.g., capacity in selected frequency bands), can be termed in some embodiments a preparation phase, with the identification of transmission information from a variety of sources. To collect transmission information, one or more embodiments can analyze existing data describing the implementation specifics of base stations, e.g., comma separated values (CSV) files exported from existing software site design and audit tools. One having skill the relevant art(s), given the description herein will appreciate the variety of sources that can provide initial and updated transmission information.

It should be noted that, while many of the examples described herein are directed to existing base station equipment implementations, these examples are non-limiting, and one having skill in the relevant art(s), given the description herein would appreciate that instead working with existing antenna faces, other embodiments can start with intended coverage zones and specified levels of service and redundancy, as well as transmission information about existing faces, and derive placement and configuration instructions for new wireless resources, e.g., location, direction, carrier signal configuration.

The following section discusses different types of transmission information that can be used by one or more embodiments described herein. For example, for carrier signal 412C (e.g., similar in characteristics to an LTE or earlier generation macro signal), different combinations of transmission information can be collected via transmission information component 122, including, but not limited to the geographic location of the transmitting face 410A, the direction of transmitting face 410A, beam width 415 of the beam of carrier signal 412C, the elevation of face 410A, the frequency of carrier signal 412C, and the transmission power of carrier signal 412C. Based at least on transmission information such as the information notes above, the approximate signal propagation labeled for carrier signal 412C can be identified, e.g., by analyzer component 124. Additional transmission information that are of specific use for IOT resource allocation are discussed with FIG. 5 below.

In another example of predicted placement of signals by one or more embodiments, carrier signals 412A-B are depicted as having narrow beams (e.g., also termed 'pencil-beams'), and are similar to the carrier signals used by mmWave antenna arrays of a fifth generation (5G) network or other next generation network implementation. One having skill in the relevant art(s), given the disclosure herein, will appreciate that similar combinations of the transmission information noted above for carrier signal 412C can be used to predict the beams labeled as 412A-B in FIG. 4, albeit with the signals having a narrower beam width than carrier signal 412C.

In addition, in one or more embodiments, transmission information can include terrain and clutter information about the path of the analyzed carrier signals 412A-C, e.g., if a carrier signal is blocked by building clutter, locations predicted by one or more embodiments can be less accurate. One having skill in the relevant art(s), given the description and suggestions herein, will appreciate additional combinations of transmission information that can be used to predict the beams depicted.

In addition to the example initial analyses described above, one or more embodiments can analyze in real-time, changes to transmission information. Example sources of updated transmission information collected by transmission information component 122 include, but are not limited to, traffic reports collected by base station equipment 480, and any performance indicator information generated by connected IOT devices.

Regarding IOT usage in a particular area. Returning to the example base station equipment 180 of FIG. 2 above, in one or more embodiments, computer executable components 220 can further include instructions that, when executed by processor 160, can facilitate performance of operations defining, performance metric component 215 of base station equipment 180. In accordance with one or more embodiments, performance metric component 215 can detect operating data about the performance of different carrier signal designed implemented by one or more embodiments.

FIG. 5 is a diagram of a non-limiting example system 500 that can facilitate allocating resources to zones for Internet of things equipment, in accordance with one or more embodiments. For purposes of brevity, description of like elements and/or processes employed in other embodiments is omitted.

As depicted, system 500 includes base stations 580A-B having faces 510A-B respectively. Face 510A is depicted as a source of carrier signals 512A-C, and face 510B is depicted being the source of carrier signal 512D. In this example, carrier signals 512B-D are narrowband beams and 512A is a wider band macrocell antenna with a wider beam width. Further in this example, IOT zones 520A-B are identified, with different combinations of signals being evaluated by one or more embodiments to achieve efficient, redundant IOT coverage for the zones.

In terms of the signals analyzed, while FIG. 4 generally depicts intra-site analysis of carrier signal beams of base station equipment 480, FIG. 5 depicts potential intra-site carrier candidates for coverage of IOT zones 520A-B. Base on depicted coverage, and not considering the characteristics of the respective signals, candidates for coverage of IOT zone 520A includes carrier signals 512A-B from face 510A of base station equipment 580 and carrier signal 512D from face 510B of base station 580B.

In this discussion, additional types of transmission information that can be collected from different components of system 500 are discussed, including, but not limited to, baseband hardware limitations of base station equipment 580A-B, dependencies between numbers of transmit and receive antennas, variants in baseband used, cell range dependencies, radio frequency hardware dependencies, baseband software dependencies, and implementation of 5G NR capabilities by hardware components. One having skill in the relevant art(s), given the present disclosure, will appreciate how the above transmission information can aid in the selection and prioritization of different signals with coverage of a particular area.

Another type of transmission information concerns the communications protocols that can be used to provide IOT services to IOT zones 520A-B, in certain implementations. For example, some types of IOT devices use a category M1 (CAT-M) communications protocol and some IOT devices use the more recently developed narrowband IOT (NB-IOT) protocol. One having skill in the relevant art(s), given the description herein would appreciate that these two protocols can, for example, require carrier signal characteristics (e.g., available frequency bands) and can have different associated overhead, with this transmission information being evaluated by one or more embodiments.

An example embodiment that analyzes communications protocol requirements can be stored as executable instructions on a non-transitory machine-readable medium that, when executed by a processor of a system, facilitate performance of operations, can provide an example evaluation, selection, and implementation of an IOT service using a communication protocol. The operations can include identifying carrier transmission information corresponding to carrier signals 512B and 512A, originating from antenna face 510A. As described and suggested above, this transmission information can include information useful to evaluate the use of different communications protocols. The operations can further include, analyzing the carrier transmission information to prioritize the analyzed carriers for potential coverage of IOT zone 520A. In this example, based different combinations of transmission characteristics, carrier signals 512B can be selected. Further, as a condition of selection, the IOT signal will be communicated utilizing the NB-IOT protocol described above.

Based at least on the combinations of features described above, one or more embodiments can provide accurate solutions, e.g., based on face analysis and other transmission characteristics. Based on access to parameters associated with IOT coverage, one or more embodiments can also audit combinations of IOT parameters, and provide a way of implementing remediated parameter settings.

FIG. 6 illustrates an example method 600 that can facilitate allocating resources to zones for Internet of things equipment, in accordance with one or more embodiments. For purposes of brevity, description of like elements and/or processes employed in other embodiments is omitted.

At 602, method 600 can include identifying, by carrier allocation equipment comprising a processor, carrier transmission information corresponding to transmission of a first carrier signal configured to support Internet of things equipment. At 604, method 600 can include analyzing, by the carrier allocation equipment, the carrier transmission information to determine coverage information corresponding to a potential for coverage, by the first carrier signal, of an Internet of things equipment support zone corresponding to a geographic area. At 606, method 600 can include based on the coverage information, facilitating, by the carrier allocation equipment, configuring transmission parameter information, representative of a transmission parameter applicable to the coverage of the Internet of things equipment support zone by the first carrier signal.

FIG. 7 is a diagram of a non-limiting example flowchart of a system 700 that can facilitate configuring a carrier signal of base station equipment to provide IOT equipment support, in accordance with one or more embodiments. In one or more embodiments, base station equipment 180 can be implemented in a software platform that includes several interconnected computer-executable components 220. As depicted, system 700 includes parameter receiving component 222, configuring component 224, and other components not depicted that are described or suggested by different embodiments of the present disclosure.

In an example, at 702, parameter receiving component 222 can be configured to receive, from configuration equipment (e.g., carrier allocation equipment 150), transmission parameter data, representative of a transmission parameter applicable to configure base station equipment 180 for coverage of IOT zone 520A by carrier signal 512B configured to provide IOT equipment support, with the transmission parameter data being a result of an analysis, by the configuration equipment, of carrier transmission data corresponding to the carrier signals 512B-C.

Continuing the example depicted, at 704, configuring component 224 can be configured to, based on the transmission parameter data, configure the carrier signal to provide the IOT equipment support with respect to IOT zone 520A by carrier signal 512B.

FIG. 8 depicts an example 800 non-transitory machine-readable medium 810 that can include executable instructions that, when executed by a processor of a system, can facilitate allocating resources to zones for Internet of things equipment, in accordance with one or more embodiments described above. For purposes of brevity, description of like elements and/or processes employed in other embodiments is omitted. As depicted, non-transitory machine-readable medium 810 includes executable instructions that can facilitate performance of operations 802-806.

In one or more embodiments, the operations can include operation 802 that can identify carrier transmission information corresponding to a first carrier and a second carrier, originating from an antenna face. Operation 804 can analyze the carrier transmission information to prioritize the first carrier and the second carrier for potential coverage of an Internet of things zone corresponding to a geographic area. Operation 1206 can, based on a priority of the first carrier, send a transmission parameter of the first carrier to network equipment to enable the coverage of the Internet of things zone by the first carrier.

Figure 9:
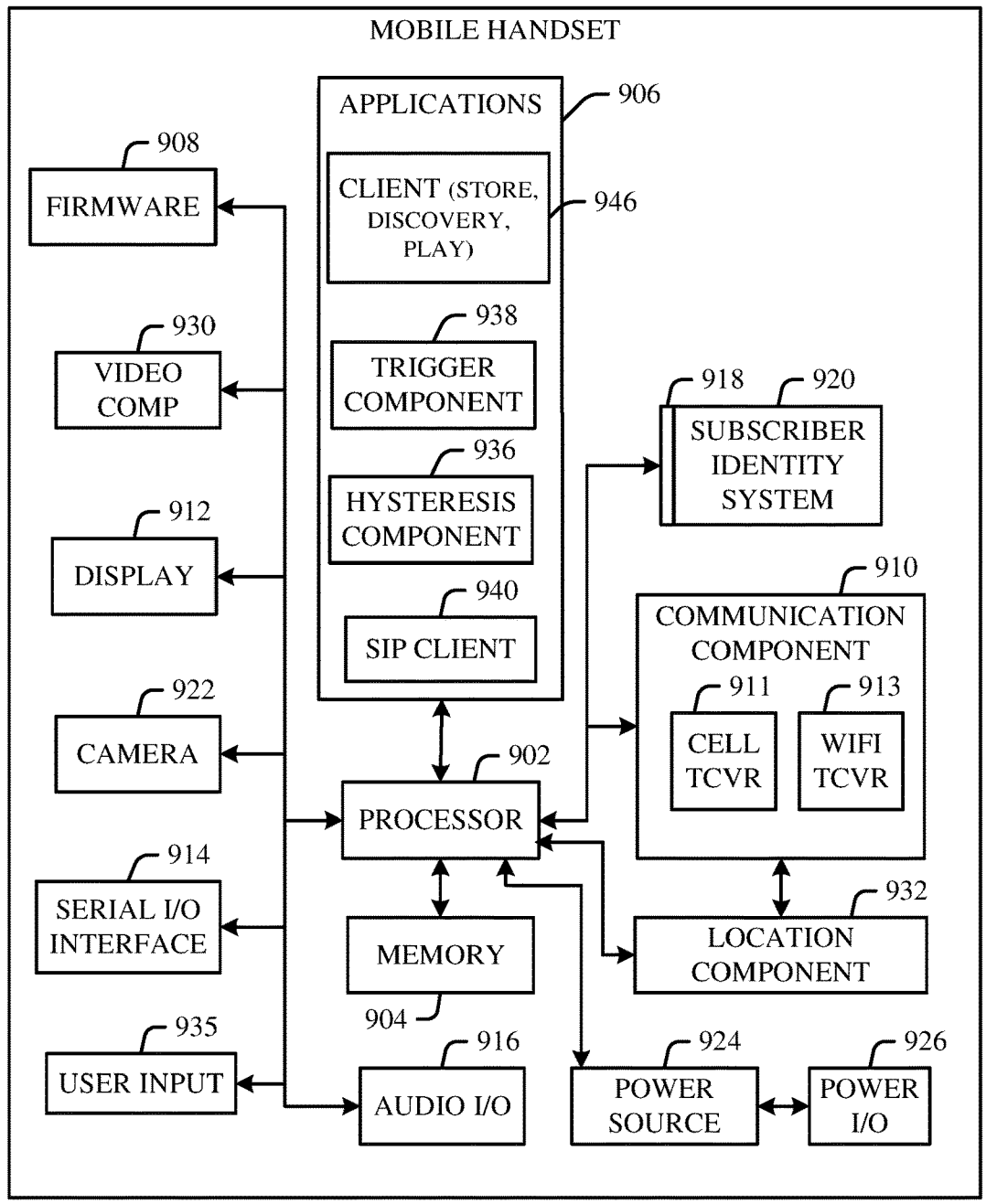
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 99 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
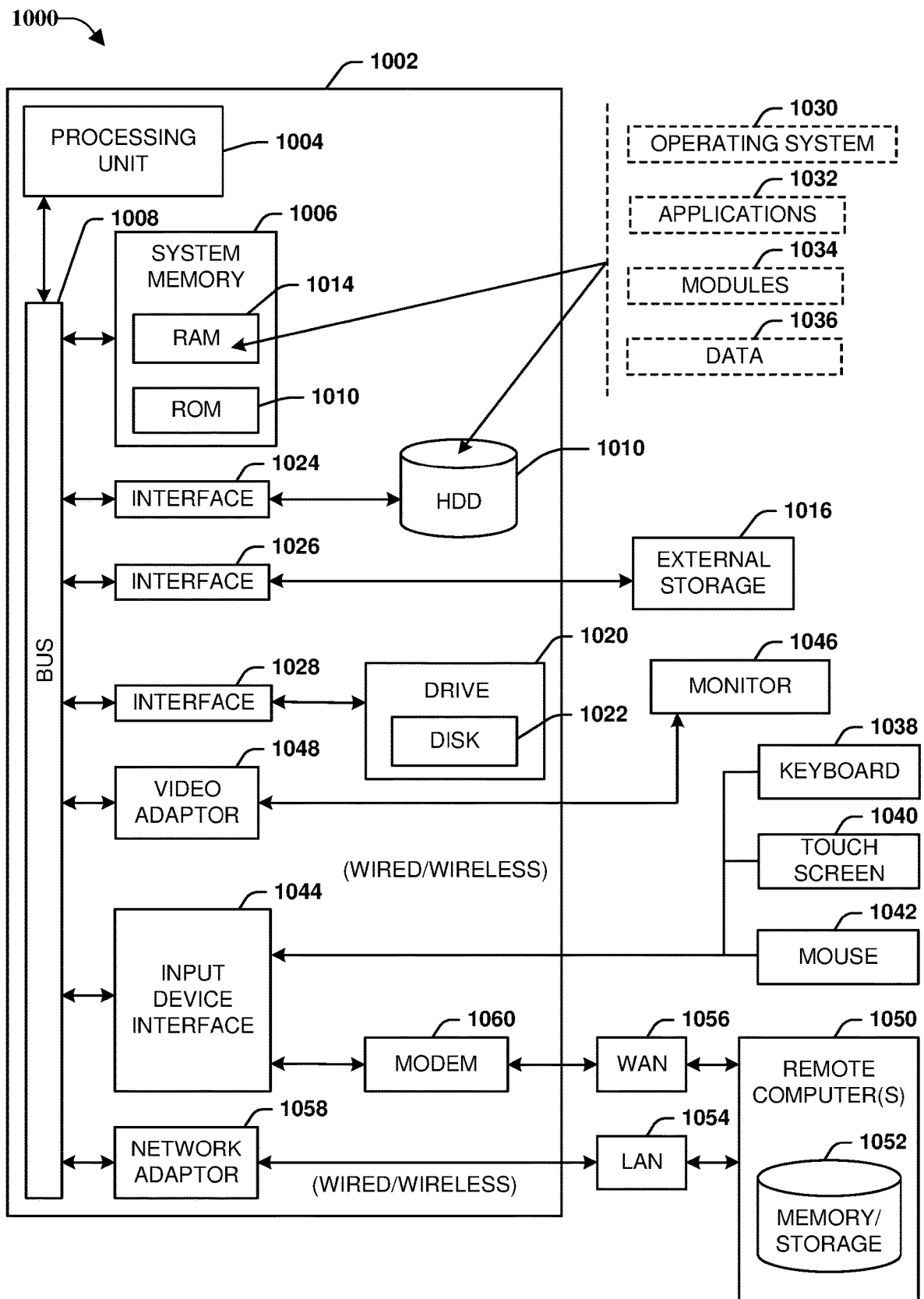
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

FIG. 10 depicts an example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1014 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed.

While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE) or 5G; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
    facilitating, by a base station device comprising a processor, receiving, from configuration equipment, transmission parameter data representative of a transmission parameter applicable to provision of coverage of an Internet of things device using a first carrier signal configured to provide Internet of things device support, wherein the transmission parameter data comprises a result of an analysis, by the configuration equipment, of carrier transmission data corresponding to the first carrier signal, and wherein the transmission parameter data further comprises an indication that the first carrier signal is to be transmitted with a second carrier signal and that the first carrier signal and the second carrier signal are to be transmitted from a specified antenna face of the base station device,
    based on the transmission parameter data, configuring, by the base station device, the first carrier signal to provide the coverage to the Internet of things device, and
    based on the transmission parameter data, configuring, by the base station device, the second carrier signal to provide backup coverage to the Internet of things device as backup for the coverage.

2. The method of claim 1, further comprising, facilitating, by the base station device, receiving, from the configuration equipment, updated transmission parameter data representative of an updated transmission parameter applicable to further configure the coverage to the Internet of things device, and wherein the updated transmission parameter data comprises a result of further analysis, by the configuration equipment, of updated carrier transmission data corresponding to a measurement of performance of the coverage provided to the Internet of things device.

3. The method of claim 2, wherein the updated transmission parameter data further comprises parameter data to change the coverage provided to the Internet of things device to being provided using the second carrier signal.

4. The method of claim 1, wherein the transmission parameter data further comprises prediction information corresponding to a predicted type of Internet of things device, and wherein, based on the predicted type of Internet of things device, a communications protocol is selected to use in providing the coverage.

5. The method of claim 1, wherein the transmission parameter data further comprises energy expenditure information corresponding to an estimated overhead cost for the coverage provided to the Internet of things device using the first carrier signal, and wherein based on the estimated overhead cost, the second carrier signal is identified as usable as an alternative to the first carrier signal.

6. Network equipment, comprising:
    a processor; and
    a memory that stores executable instructions that, when executed by the processor, facilitate performance of operations, comprising:
        identifying carrier transmission information corresponding to transmission of a first carrier signal configured to support Internet of things equipment,
        analyzing the carrier transmission information to determine coverage information corresponding to a potential for coverage, using the first carrier signal, of an Internet of things equipment support zone corresponding to a geographic area,
        based on the coverage information, configuring a transmission parameter applicable to the coverage of the Internet of things equipment support zone by the first carrier signal, wherein the carrier transmission information comprises carrier information indicating that the first carrier signal is to be transmitted with a second carrier signal and that the first carrier signal and the second carrier signal are to be transmitted from a first antenna face, and
        based on the carrier transmission information, selecting the second carrier signal to provide backup coverage for the coverage of the Internet of things equipment support zone.

7. The network equipment of claim 6, wherein the carrier transmission information further comprises antenna direction information representative of a direction applicable to an orientation of an antenna for the transmission of the first carrier signal.

8. The network equipment of claim 6, wherein the carrier transmission information further comprises signal characteristic information representative of a signal characteristic of the first carrier signal.

9. The network equipment of claim 6, wherein the carrier information comprises first carrier information, wherein the carrier transmission information further comprises second carrier information indicating that a third carrier signal is to be transmitted from the first antenna face in addition to the first carrier signal and the second carrier signal, wherein the operations further comprise, based on the carrier transmission information, identifying the first carrier signal and the second carrier signal as candidates for the coverage of the Internet of things equipment support zone, and wherein selecting the first carrier signal for the coverage comprises selecting the first carrier signal from the candidates.

10. The network equipment of claim 9, wherein the carrier transmission information further comprises third carrier information indicating that a fourth carrier signal is to originate from a second antenna face different than the first antenna face, and wherein the operations further comprise, based on the carrier transmission information, identifying the fourth carrier signal as an additional candidate, other than the candidates, for the coverage of the Internet of things equipment support zone.

11. The network equipment of claim 10, wherein the first antenna face and the second antenna face are respectively located at different sites of different base station equipment.

12. The network equipment of claim 6, wherein the operations further comprise;
receiving updated carrier transmission information for the first carrier signal representative of an update to the carrier transmission information; and
based on the updated carrier transmission information, determining an updated transmission parameter applicable to alter the coverage of the Internet of things equipment support zone using the first carrier signal.

13. The network equipment of claim 12, wherein the updated carrier transmission information comprises demand information indicating that demand for Internet of things services in the Internet of things equipment support zone has increased, and wherein the updated transmission parameter comprises a parameter usable to enable a third carrier signal to supplement the coverage of the Internet of things equipment support zone using the first carrier signal.

14. The network equipment of claim 6, wherein the carrier transmission information further comprises transmission band information corresponding to a transmission band for the transmission of the first carrier signal, and wherein analyzing the carrier transmission information to determine the coverage information comprises determining that the transmission band corresponds to a requested transmission band for the coverage of the Internet of things equipment support zone.

15. The network equipment of claim 6, wherein the carrier transmission information further comprises energy expenditure information corresponding to an estimated overhead cost for the coverage of the Internet of things equipment support zone using the first carrier signal, and wherein analyzing the carrier transmission information to determine the coverage information comprises evaluating the estimated overhead cost for the coverage compared to the second carrier signal usable as an alternative to the first carrier signal.

16. The network equipment of claim 6, wherein the carrier transmission information further comprises prediction information corresponding to a predicted type of Internet of things device to be supported in the Internet of things equipment support zone, and wherein analyzing the carrier transmission information to determine the coverage information comprises, based on the predicted type of Internet of things device, selecting a communications protocol to use in providing the coverage.

17. The network equipment of claim 16, wherein the communications protocol comprises a narrowband Internet of things communications protocol.

18. A non-transitory machine-readable medium, comprising executable instructions that, when executed by a processor of base station equipment, facilitate performance of operations, comprising:
receiving transmission parameter data representative of a transmission parameter for coverage of Internet of things equipment by a first carrier signal configured to enable Internet of things equipment support, wherein the transmission parameter comprises a result of an analysis of carrier transmission data corresponding to the first carrier signal, and wherein the transmission parameter further comprises an indication that the first carrier signal is to be transmitted with a second carrier signal and that the first carrier signal and the second carrier signal are to be transmitted from a specified antenna face,
based on the transmission parameter, configuring the first carrier signal to enable the coverage to the Internet of things equipment, and
based on the transmission parameter, configuring the second carrier signal to enable backup coverage to the Internet of things equipment to supplement the coverage.

19. The non-transitory machine-readable medium of claim 18, wherein the transmission parameter comprises a parameter usable to configure the first carrier signal to enable the coverage with a category M1 communications protocol.

20. The non-transitory machine-readable medium of claim 18, wherein the transmission parameter comprises a parameter usable to configure the first carrier signal to enable the coverage with a narrowband Internet of things communications protocol.

* * * * *